Patented Aug. 28, 1951

2,566,288

UNITED STATES PATENT OFFICE 2,566,288

DIALKYLDITHIOPHOSPHATO-METHYLUREAS

Edwin O. Hook, Old Greenwich, Conn., and Philip H. Moss, Austin, Tex., assignors to American Cyanamid Company, New York, N. Y., a corporation of Maine No Drawing. Application June 3, 1950, Serial No. 166,062

6 Claims. (Cl. 260—461)

This invention relates to a novel class of urea derivatives which are hereinafter defined as dialkyldithiophosphatomethylureas. The invention includes the novel compounds themselves, their methods of preparation, and compositions containing them.

The novel urea derivatives of the invention are defined with accuracy by the formula

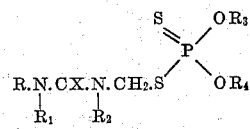

in which $R_3$ and $R_4$ are aliphatic radicals of any desired molecular weight, but preferably contain from one to about 18 carbon atoms. Inasmuch as compounds falling within the scope of the invention can be prepared from unsubstituted as well as from substituted ureas, it will be evident that either or both of $R_1$ and $R_2$ may be hydrogen or an alkyl radical. When monoalkyl- or dialkylureas or thioureas are used in the preparation of our novel compounds they are preferably of relatively low molecular weight, and therefore the hydrocarbon radicals represented by $R_1$ and $R_2$ are usually alkyl radicals of 1–8 carbon atoms. The radical R may be any aliphatic radical, but is preferably an aliphatic hydrocarbon radical of 1–18 carbon atoms, since the radicals of this class impart desirable solubility in hydrocarbon solvents when the compounds are used as antioxidants, as will hereinafter be more fully explained. The radical R can also be an O,O-dialkyldithiophosphatomethyl radical when bis-compounds are prepared.

The new compounds of our invention, as defined above, vary in appearance from liquids to crystalline solids, most of which are light in color. Ordinarily the bis-compounds of lower molecular weight are solids, whereas those in which $R_3$ and $R_4$ contain five or more carbon atoms are thick, viscous liquids that are soluble in lubricating oil. Most of the mono-(dialkyldithiophosphatomethyl) ureas and thioureas of the invention are liquids of which only the higher O,O-dialkyldithiophosphoric acid derivatives are oil-soluble.

The compounds of our invention are prepared by reacting an unsubstituted urea or thiourea or an alkyl-substituted urea or thiourea containing a reactive hydrogen attached to one of the amido groups with formaldehyde and with a suitable O,O-dialkyldithiophosphoric acid. If desired, the formaldehyde may be first reacted with the urea or thiourea to form a methylol derivative. In some cases it may be advantageous to form the alkoxymethylurea or thiourea compounds, which will then react with the dithiophosphoric acid diesters by splitting out alcohol. Methylol urea and thiourea ethers of this type can be prepared, for example, by the method described in U. S. Patent No. 2,397,825, dated April 2, 1946.

In carrying out the reaction the reagents may be mixed together at room temperature or at elevated temperatures up to about 80–100° C. in the presence or absence of solvents or diluents such as aliphatic alcohols, benzene, toluene and the like. In most cases, however, it is preferable to carry out the condensation at room temperature or at only slightly elevated temperatures up to about 50° C. in order to avoid loss of hydrogen sulfide from the O,O-dialkyldithiophosphoric acid. From 1 to 2 mols of formaldehyde and of O,O-dialkyldithiophosphoric acid may be reacted with 1 mol of urea or alkylurea, depending on whether the mono-derivatives or the bis-compounds are desired. It should be noted, however, that when unsubstituted urea or thiourea is used it is necessary to employ 2 mols of formaldehyde and of dialkyldithiophosphoric acid for each mol thereof in order to avoid the danger of polymerization and resulting resin formation.

It will be evident from the foregoing that any O,O-dialkyl ester of dithiophosphoric acid may be used in practicing the process of our invention. When compounds having a relatively high percentage of phosphorus and sulfur are desired, as is frequently the case when our novel urea derivatives are to be used as metal deactivators, a lower O,O-dialkyldithiophosphoric acid may be employed. Typical dialkyl esters of this class are the dimethyl, diethyl, dibutyl and diamyl esters. Where solubility in lubricating oil is a factor, as in the preparation of lubricating oil antioxidants, the dialkyl esters of higher molecular weight such as the O,O-dihexyl, diheptyl, dioctyl, didecyl and dioctadecyl esters of dithiophosphoric acid are most commonly used. Compounds containing representative members of these classes are illustrated in the following examples.

As is indicated above, any urea or thiourea may be employed which contains at least one reactive amido group. For most purposes we prefer the monoalkylureas and thioureas and the dialkylureas and thioureas in which each alkyl radical contains from 1 to about 8 carbon atoms. In general, we prefer to employ either unsubstituted urea or thiourea, when bis-compounds are prepared, or monoalkylureas in which the alkyl radical contains from 1 to about 6 carbon atoms, since these ureas are most easily and cheaply prepared. It is an advantage of our invention that the necessary oil-solubilizing alkyl radicals of higher molecular weight can easily be introduced with the O,O-dialkyldithiophosphoric acid groups, and therefore the use of the more highly substituted ureas and thioureas is unnecessary.

The invention will be further illustrated by the following specific examples. It will be understood, however, that although these examples may describe in detail some of the more specific features of the invention, they are given primarily for purposes of illustration and the invention in its broader aspects is not limited thereto.

Example 1

A mixture of 35 grams (0.3 mol) of assymetrical diethylurea and 62 grams (0.3 mol) of distilled diethyldithiophosphoric acid (N. E. 208) was prepared and 27 grams (0.33 mol) of aqueous formaldehyde was added with stirring at room temperature. After stirring overnight the reaction mixture was diluted with benzene and the organic layer was washed with water, then with dilute sodium carbonate solution, and again with water. The solution was dried over Na$_2$SO$_4$ and the benzene removed by distillation under reduced pressure on the steam bath. The yield was 82 grams of a pale greenish-yellow liquid which had only a limited solubility in lubricating oil. It was 1-diethyldithiophosphatomethyl-3,3-diethylurea of the formula

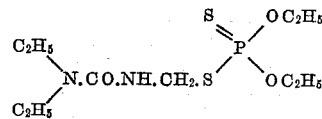

Example 2

Following the procedure of Example 1 a solution of 29 grams (0.25 mol) of symmetrical diethylurea and 53 grams (0.25 mol) of diethyldithiophosphoric acid in dioxane was reacted with 24 grams (0.27 mol) of 37% aqueous formalin. The yield was 76 grams of a light tan oil having a pleasant odor. It was N-(diethyldithiophosphatomethyl)-N,N'-diethylurea of the formula

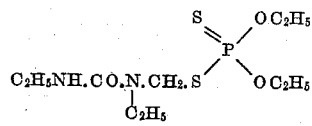

Example 3

A mixture of 19 grams (0.125 mol) of dimethoxydimethylurea and 54 grams (0.25) mol of diethyldithiophosphoric acid was prepared and heated with agitation to 35–40° C. It was then allowed to stand for 17 hours. The resulting product was a mass of white crystals that were very soluble in cold ethyl acetate and slightly soluble in hot heptane. After recrystallization from dilute methanol a product having a melting point range of 68–78° C. was obtained. It was N,N'-(diethyldithiophosphatomethyl) urea of the formula

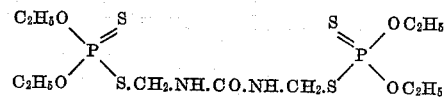

Example 4

36 grams (0.44 mol) of formalin was added slowly at room temperature to a stirred mixture of 15 grams (0.2 mol) of thiourea and 84 grams (0.4 mol) of distilled diethyldithiophosphoric acid (N. E. 208). Some heat was evolved. Stirring was continued for 2 hours, after which the reaction mixture was allowed to separate into two layers. The aqueous layer was discarded and the oil layer diluted with benzene and washed successively with water, dilute Na$_2$CO$_3$ solution until basic, and twice more with water. After drying over Na$_2$SO$_4$ and removal of the solvent under reduced pressure on the steam bath, 72 grams of heavy oil was obtained which crystallized on standing overnight. Recrystallization from a large volume of heptane yielded white crystals melting at 66–68° C. The product was 1,3-bis-(diethyldithiophosphatomethyl) thiourea of the formula

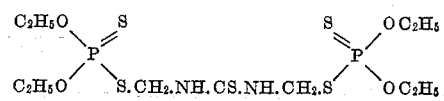

Example 5

A solution of 14.5 grams (0.15 mol) of n-butylurea was stirred in 50 cc. of dioxane as 52 grams (0.25 mol) of distilled diethyldithiophosphoric acid (N. E. 208) was added. Following this, 23 grams (0.27 mol) of 37% formalin was poured in. The reaction mixture, which was completely miscible, was left overnight. In the morning it was washed successively with water, sodium carbonate solution, and finally water. Sufficient benzene was added during the washing to prevent crystallization of the product. The benzene solution was dried over sodium sulfate and then freed of solvent on a steam bath. The product, weighing 81 grams, was a light-colored and crystalline tan solid. It was N,N'-bis-(diethyldithiophosphatomethyl) butylurea of the formula

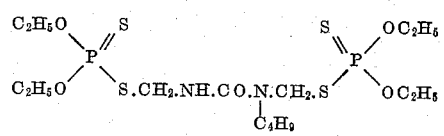

Example 6

A mixture of 29 grams (0.25 mol) of diethylurea and 102.5 grams (0.25 mol) of di-n-decyldithiophosphoric acid was prepared and agitated as 23 grams of aqueous formaldehyde were added. The resulting mixture was agitated at 40° C. for 3 hours and then allowed to stand overnight. The product was then diluted with benzene, washed and stripped as in previous examples. The product, weighing 112 grams, was a thick yellowish liquid that was soluble in lubricating oil. It was 1-diethyldithiophosphatomethyl-3,3-diethylurea of the formula

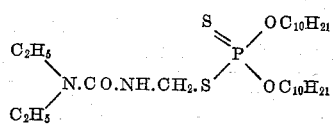

Example 7

A mixture of 134 grams (0.5 mol) of di-n-butyldithiophosphoric acid (N. E. 268) and 15 grams (0.25 mol) of urea was stirred in an ice bath cooled flask and 45 grams (0.53 mol) of 37% formalin was added. After the mildly exothermic reaction had subsided the mixture was stirred overnight. The water-insoluble layer was washed with sodium carbonate solution and then with water and stripped on a steam bath at reduced pressure to give 96 grams of a light brown liquid. It was N,N'-bis-(di-n-butyldithiophosphatomethyl)urea of the formula

Example 8

A quantity of di-n-propyldithiophosphoric acid (N. E. 241) weighing 61 grams (0.25 mol) was agitated and 19 grams (0.125 mol) of dimethoxydimethylurea were added. The urea compound dissolved slowly in the liquid while the temperature rose to 45° C. The solution was then allowed to stand for 16 hours, after which time it had changed to a light-colored, completely solid crystalline mass. This was N,N'-bis-(dipropyldithiophosphatomethyl) urea of the formula

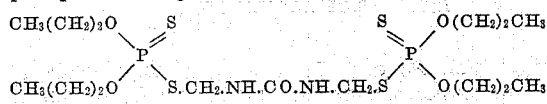

Example 9

Following the procedure of Example 7, 36 grams (0.44 mol) of formalin was added slowly at room temperature to a stirred mixture of 15 grams (0.2 mol) of thiourea and 108 grams (0.4 mol) of crude dibutyldithiophosphoric acid (N. E. 268). Stirring was continued overnight. The mixture was diluted with benzene and the organic layer washed successively with water, dilute Na2CO3 solution until basic, and again with water. After drying over Na2SO4 and removal of the solvent under reduced pressure on the steam bath, 116 grams of light-amber liquid was obtained which was free of H2S but not soluble in lubricating oil. It was 1,3-bis-(dibutyldithiophosphatomethyl) thiourea of the formula

Example 10

100 grams (0.29 mol) of crude diamyldithiophosphoric acid (N. E. 346) was mixed with 8.8 grams (0.146 mol) of urea and stirred as 26 grams (0.32 mol) of 37% formalin was added. The reactants were stirred for 3½ hours and then allowed to stand overnight. Benzene was added to the polyphase product and the benzene solution resulting was washed with water, sodium carbonate solution, and finally with water. During the first steps of the washing procedure, approximately 5 grams of light-colored solid by-product was removed by filtration. Benzene was distilled from the ester on a steam bath under reduced pressure leaving 103 grams of a brown-colored thick liquid having a very pleasant odor. It was N,N'-bis-(diamyldithiophosphatomethyl) urea of the formula

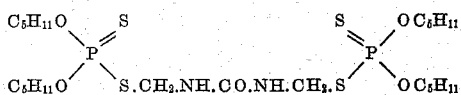

Example 11

One-tenth mol (41 grams) of di-n-decyldithiophosphoric acid and 0.05 mol (7.4 grams) of dimethoxydimethylurea were mixed and warmed for 5 minutes on a steam bath. The substituted urea dissolved and almost immediately the color of the mixture became much lighter. The reactants were allowed to stand at room temperature for 24 hours and then stripped under a vacuum at 95° C. The product was a viscous liquid having an unpleasant odor. It was N,N'-bis-(didecyldithiophosphatomethyl) urea of the formula

A sample of the product was dissolved in a Mid-Continent lubricating oil of SAE 30 grade and tested by the Underwood oxidation test at 0.5% concentration against silver-cadmium bearings. The bearing loss at the end of the test was 4 milligrams.

Example 12

A quantity of di-n-octadecyldithiophosphoric acid weighing 319 grams (0.5 mol) was melted on a steam bath and a solution of 37 grams (0.25 mol) of dimethoxydimethylurea in alcohol was added. The mixture was stirred at 50-60° C. for about 1 hour and allowed to stand overnight after which it was diluted with benzene, washed with water and stripped on the steam bath at reduced pressure. The product, a light colored waxy solid, was easily soluble in lubricating oil. It was N,N'-bis-(dioctadecyldithiophosphatomethyl) urea of the formula

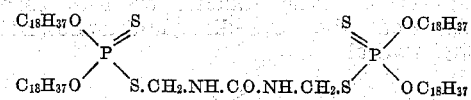

What we claim is:
1. Dialkyldithiophosphatomethylureas of the formula

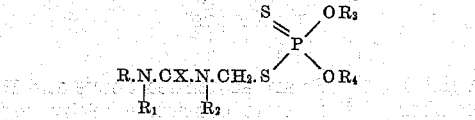

in which R3 and R4 are aliphatic radicals of 1-18 carbon atoms, R1 and R2 are members of the group consisting of hydrogen and alkyl radicals of 1-8 carbon atoms and R is a member of the group consisting of aliphatic radicals of 1-18 carbon atoms and the O,O-dialkyldithiophosphatomethyl radical

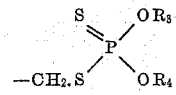

and X is a member of the group consisting of oxygen and sulfur.

2. Dialkyldithiophosphatomethylureas of the formula

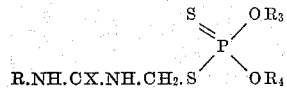

in which R3 and R4 are aliphatic radicals of 1-18 carbon atoms, R is a member of the group consisting of aliphatic radicals of 1-18 carbon atoms and the O,O-dialkyldithiophosphatomethyl radical of the formula

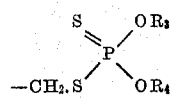

and X is a member of the group consisting of oxygen and sulfur.

3. Bis-dialkyldithiophosphatomethylurea of the formula

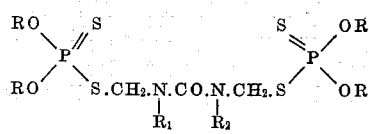

in which $R_1$ and $R_2$ are members of the group consisting of hydrogen and alkyl radicals of 1-8 carbon atoms and each R is an aliphatic radical of 1-18 carbon atoms.

4. Bis-dialkyldithiophosphatomethylurea of the formula

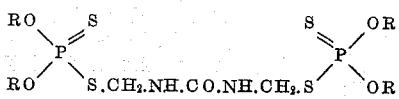

in which each R is an aliphatic radical of 1-18 carbon atoms.

5. A method of preparing a dialkyldithiophosphatomethylurea of the formula

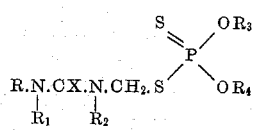

in which $R_3$ and $R_4$ are aliphatic radicals of 1-18 carbon atoms, $R_1$ and $R_2$ are hydrogen or alkyl radicals of 1-8 carbon atoms, X is oxygen or sulfur and R is a member of the group consisting of aliphatic radicals of 1-18 carbon atoms and the O,O-dialkyldithiophosphatomethyl radical

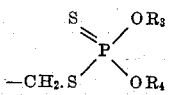

which comprises reacting a urea of the formula

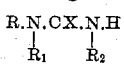

in which $R_1$ and $R_2$ are as defined above and R is a member of the group consisting of hydrogen and aliphatic radicals of 1-18 carbon atoms with from one to two mols of formaldehyde and of an O,O-dialkyldithiophosphoric acid of the formula

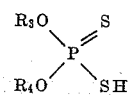

in which $R_3$ and $R_4$ are as defined above, two mols of said formaldehyde and O,O-dialkyldithiophosphoric acid being reacted with one mol of said urea when R is hydrogen, and the reaction being carried out by mixing the reagents and allowing them to react at a temperature between room temperature and 100° C.

6. A method of preparing a dialkyldithiophosphatomethylurea of the formula

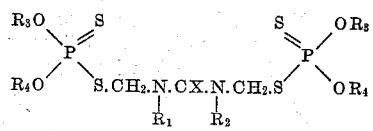

in which $R_3$ and $R_4$ are aliphatic radicals of 1-18 carbon atoms, $R_1$ and $R_2$ are hydrogen or alkyl radicals of 1-8 carbon atoms and X is oxygen or sulfur which comprises mixing one mol of a urea of the formula

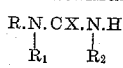

in which $R_1$ and $R_2$ are as defined above and R is a member of the group consisting of hydrogen and aliphatic radicals of 1-18 carbon atoms with at least two mols of formaldehyde and of an O,O-dialkyldithiophosphoric acid of the formula

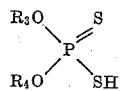

in which $R_3$ and $R_4$ are as defined above at a temperature between room temperature and 100° C. and recovering the reaction product.

EDWIN O. HOOK.
PHILIP H. MOSS.

No references cited.